United States Patent
Limbeck

(10) Patent No.: US 8,685,578 B2
(45) Date of Patent: Apr. 1, 2014

(54) FUEL CELL SYSTEM FOR A VEHICLE, METHOD FOR MONITORING A FUEL CELL SYSTEM

(75) Inventor: Uwe Limbeck, Kirchheim (DE)

(73) Assignee: Daimler AG, Stuttgart (DE)

( * ) Notice: Subject to any disclaimer, the term of this patent is extended or adjusted under 35 U.S.C. 154(b) by 809 days.

(21) Appl. No.: 12/669,360

(22) PCT Filed: May 23, 2008

(86) PCT No.: PCT/EP2008/004113
§ 371 (c)(1),
(2), (4) Date: May 6, 2010

(87) PCT Pub. No.: WO2009/010119
PCT Pub. Date: Jan. 22, 2009

(65) Prior Publication Data
US 2010/0233559 A1    Sep. 16, 2010

(30) Foreign Application Priority Data

Jul. 17, 2007 (DE) .......................... 10 2007 033 202

(51) Int. Cl.
*H01M 8/06* (2006.01)

(52) U.S. Cl.
USPC ........... 429/427; 429/428; 429/429; 429/430; 429/431; 429/432; 429/443

(58) Field of Classification Search
USPC .......................................... 429/427–432, 443
See application file for complete search history.

(56) References Cited

U.S. PATENT DOCUMENTS

2002/0146610 A1 * 10/2002 Hayashi et al. ................. 429/30
2005/0074649 A1 * 4/2005 Skiba et al. ..................... 429/26
2006/0194082 A1 * 8/2006 Tucker et al. ..................... 429/9

FOREIGN PATENT DOCUMENTS

JP          2005-190967 A       7/2005
WO    WO 2005/101561 A2    10/2005
WO    WO 2006/059776 A2     6/2006

OTHER PUBLICATIONS

International Search Report dated Dec. 1, 2008 (three (3) pages).
Form PCT/ISA/237 (five (5) pages), dated Apr. 2005.

* cited by examiner

*Primary Examiner* — Patrick Ryan
*Assistant Examiner* — Ben Lewis
(74) *Attorney, Agent, or Firm* — Crowell & Moring LLP

(57) ABSTRACT

A fuel cell system for a vehicle includes a fuel cell arrangement that is coupleable to a vehicle drive as a primary load, and to a plurality of secondary loads. A control apparatus which controls the primary load and the secondary loads includes a monitoring circuit that is operable in a special operating mode of the fuel cell system, with the secondary loads being switched on and/or off as a manipulated variable in order to maintain the output voltage, as a reference variable, at a low voltage value that is formed by a cell voltage of the fuel cells of less than 0.45 V on average.

18 Claims, 2 Drawing Sheets

FUEL CELL SYSTEM FOR A VEHICLE, METHOD FOR MONITORING A FUEL CELL SYSTEM

This application is a national stage of PCT International Application No. PCT/EP2008/004113, filed May 23, 2008, which claims priority under 35 U.S.C. §119 to German Patent Application No. 102007033202.7, filed Jul. 17, 2007, the entire disclosure of which is herein expressly incorporated by reference.

BACKGROUND AND SUMMARY OF THE INVENTION

The present invention relates to a fuel cell system for a vehicle having a fuel cell arrangement that includes a plurality of fuel cells and is designed to emit an output voltage, an output current and an output power during operation, with each fuel cell being designed to emit a cell voltage during operation. A vehicle drive forms a primary load, while a plurality of secondary loads are also present. A control apparatus controls the primary and secondary loads. The invention also provides a corresponding method.

Fuel cell systems are used as mobile energy sources for vehicles and are a futuristic alternative to conventional drive concepts using internal combustion engines. However, the implementation of this alternative leads to different requirements for matching to daily use. While conventional internal combustion engines can provide virtually the total maximum output power without delay after being started, the performance data of fuel cell systems is highly dependent on their operating conditions, such as the pressure, temperature, etc. A further exacerbating factor is that operation of a fuel cell system requires multiple peripheral components, which are needed to condition the substances used, and which likewise must be supplied with power during operation. This wide range of requirements and constraints for operation of fuel cell systems means that particular effort must be devoted during development to the control and energy management of the fuel cell systems.

For example, Japanese patent document PAJ 2005190967 (Publication Number) relates to a fuel cell system that is controlled as a function of operating parameters. This document proposes a method for starting a fuel cell system (and a corresponding fuel cell system), with the output current of the fuel cell system being controlled as a function of temperatures measured at various positions in the fuel cell system.

One object of the present invention is to provide a method and apparatus which implement an intelligent monitoring strategy for operation of the fuel cell system, even in particular operating conditions.

This and other objects and advantages are achieved by the fuel cell system according to the invention, which is suitable and/or designed for integration in a vehicle. The fuel cell system comprises a fuel cell arrangement with a plurality of fuel cells, which are preferably organized to form fuel cell stacks, with the number of fuel cells in a fuel cell stack or in the fuel cell arrangement preferably being more than 100. In one preferred embodiment, the fuel cells have a PEM membrane and are designed to create an electrochemical reaction between a fuel (in the form of hydrogen) with an oxidant (in the form of environmental air), in order to obtain electrical energy from the chemical energy.

During operation, the electrical energy is emitted from the fuel cell arrangement as an output power, at an output voltage and an output current. Each fuel cell emits a cell voltage in accordance with its polarization characteristic, with the total of cell voltages (with fuel cells preferably connected in series) resulting in the output voltage of the fuel cell arrangement or stack.

The fuel cell system has a primary load which is in the form of a vehicle drive, and a plurality of secondary loads, which can be subdivided into at least two groups: A first group relates to the peripheral components which are absolutely essential to allow operation of the fuel cell arrangement. (For example, these peripheral components may include an air compressor, fuel recirculation fan, cooling water pump and the like.) Peripheral components such as these are also referred to as parasitic components or balance-of-plant (BOP). A second group, on the other hand, comprises loads which can be switched on optionally, such as DC/DC converters for supplying a high-voltage rechargeable battery or capacitor, a DC/DC converter for supplying low-voltage components, variable loads (electrical heating device) and the like.

The fuel cell system according to the invention has a control apparatus for controlling the primary and secondary loads, particularly power distribution to the primary load and the secondary loads. The power can be distributed by switching the primary load and/or the second loads on and off in a stepped form and/or continuously variably.

According to the invention, the control apparatus includes programming and/or circuitry which provide a monitoring circuit in a special operating mode of the fuel cell system. For the purposes of the monitoring circuit, the secondary loads are switched on and/or off and controlled as a manipulated variable, such that the output voltage (as a reference variable) in the monitoring circuit is kept at a low voltage value that results from a cell voltage of the individual fuel cells of less than 0.45 V on average. In particular, the monitoring circuit may be in the form of a closed loop and/or an open loop. In modified embodiments, it may also be implemented for the purposes of a neural network, fuzzy logic, adaptive regulators, etc.

During special operating modes of the fuel cell system, it may be technically important to keep the fuel cells at a low cell voltage. This situation occurs, for example, during so-called cold and/or freezing starting of the fuel cell system, when the operating temperature of the fuel cells is less than the normal operating temperature of about 80° C. (in particular is less than 0° C.). In this special operating mode, it is desirable to actively increase the temperature of the fuel cells. It has been found that the self-heating of the fuel cells by heat losses is approximately inversely proportional to the cell voltage of the fuel cells. It is therefore advantageous for a rapid heating process for the cell voltages of the fuel cells to be kept as low as possible. Cell voltages of less than 0.45 V (particularly in a range between 0.2 and 0.45 V) have been found to be advantageous in this case. In order to obtain this low cell voltage, and the low resultant value of the output voltage, according to the invention, the secondary loads are switched on in a dynamically stepped or infinitely variable manner. In this manner, the output voltage is reduced to the said low voltage value by increasing the output current.

In one preferred embodiment of the invention, the control apparatus is designed to keep the output voltage at a constant value as the low voltage value. This embodiment has the advantage that the operation of the individual fuel cells is not adversely affected by widely fluctuating cell voltages.

The special operating mode is preferably cold starting or freezing starting and/or is arranged for an instantaneous output power from the fuel cell arrangement, in which case, although the output power is greater than the necessary self-supply power for the first group of secondary loads, it is, however, preferably less than the maximum secondary load power.

The maximum secondary load power is the power which can be achieved when all available secondary loads are connected to the fuel cell arrangement and are being operated at maximum load. For an example of a fuel cell system whose normal output voltage is 250 V to 450 V, the output current may extend up to 200 Amperes without moving the vehicle (that is, without current and power being emitted to the primary load).

Analogously, a maximum secondary load current is the current value which can be reached when all the available secondary loads are connected to the fuel cell arrangement and are being operated at maximum load at the low voltage value. The special operating mode occurs in this example when the output current is greater than the self-supply current for the peripheral components, but is less than the maximum secondary load current, in each case at the low voltage value.

In one preferred embodiment of the invention, the control apparatus is designed such that the output voltage is greater than the low voltage value in a range between zero power or zero current (that is, when the fuel cell system is being started) and a self-supply power or current. This development of the monitoring strategy provides for the output current or the power consumption to be increased in steps until the fuel cell arrangement is loaded such that the desired low voltage value occurs.

In a further optional embodiment of the invention, in an output power range in which the output power is greater than the maximum secondary load power and/or is greater than the self-supply power, or a corresponding output-current range, the control apparatus is designed to monitor the stoichiometry of the oxidant-fuel ratio as a further manipulated variable. Preferably, the stoichiometry is set by an air compressor, fan or the like.

The stoichiometry is actually the ratio of the amount of substance supplied and the amount of substance converted in the reaction in accordance with Faraday's Law, for a respective reaction partner. Both the oxidant and the fuel therefore each have their own stoichiometry values. However, in practice, the expression stoichiometry is very often used, as in the following text as well, for the ratio of these two stoichiometry values. The "stoichiometry" (lambda) in the following text therefore refers to the ratio between the oxidant and the fuel, with stoichiometry of lambda=1 defining equilibrium between these flows, a value of lambda <1 indicating a "rich ratio" with excess fuel, and a value of lambda >1 indicating a "lean ratio" with excess oxidant. The stoichiometry can be used on the one hand to control the output power of the fuel cells and on the other hand likewise to control the cell voltage, with values of lambda <1 reducing the cell voltage, and values of lambda >1 increasing the cell voltage.

The aim is therefore preferably for the manipulated variable "secondary loads switched on or off" and the manipulated variable "stoichiometry" to be controlled jointly, in order to keep the output voltage value at the low voltage value.

In one possible embodiment of the invention, the control apparatus is designed to emit a driving enable signal as soon as the available output power is greater than the self-supply power plus a variable power margin. This embodiment allows the control apparatus to assign sufficient power to the primary load, with the power output to the secondary loads being reduced at the same time in order to keep the output voltage at or below the low voltage value. The power assigned to the primary load is at least sufficient for careful or emergency operation of the vehicle at reduced power. In this case, the control apparatus is preferably designed to treat the power drawn by the driving operation as a disturbance variable in the monitoring circuit.

The invention also relates to a method for monitoring a fuel cell system, in which, in a special operating mode (for example, during cold or freezing starting), the output voltage of the fuel cell arrangement is kept at a low voltage value by switching secondary loads on or off. This low voltage value is less than the output voltage value which is formed by operation of the fuel cells in the fuel cell arrangement with a cell voltage of less than 0.45 V. This method therefore represents normal use of the fuel cell system just described.

Other objects, advantages and novel features of the present invention will become apparent from the following detailed description of the invention when considered in conjunction with the accompanying drawings.

DETAILED DESCRIPTION OF THE DRAWINGS

Figure 1:
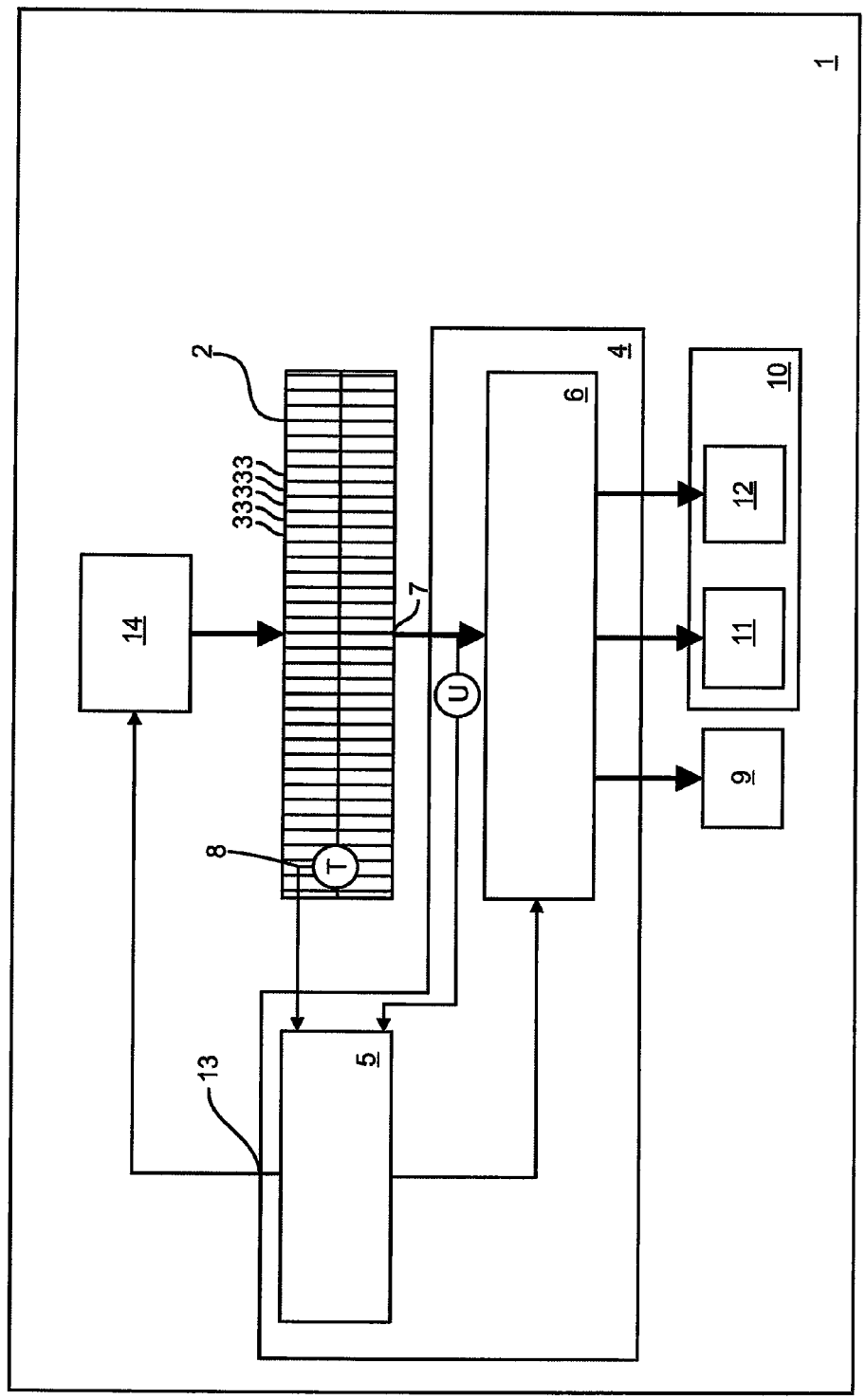
FIG. 1 is a schematic block diagram of as a first exemplary embodiment of a fuel cell system according to the invention.

FIG. 1 shows a fuel cell system 1 which has a fuel arrangement 2 with a multiplicity of fuel cells 3. The fuel cell system 1 is preferably integrated in a vehicle. In order to provide intelligent power management, the fuel cell system 1 has a control apparatus 4, which has a monitoring module 5 and a distribution module 6.

On the input side, the control apparatus 4 is connected to the power output 7 of the fuel cell arrangement 2, and optionally also receives the signal from a temperature sensor 8 which monitors the temperature T of the fuel cells 3. On the output side, the control apparatus 4 is connected to a primary load in the form of a drive motor 9 for the vehicle, and also to secondary loads 10. A first group of the secondary loads comprises peripheral components 11 (also referred to as parasitic or BOP components), and a second group of secondary loads is formed by switchable loads 12.

The control apparatus 4 optionally has an output 13 which is connected for control purposes to an air compressor 14, which compresses or accelerates the oxidant for the fuel cell arrangement 2 and the fuel cells 3.

In the control apparatus 4, a voltage signal U is tapped off from the power output of the fuel cell arrangement 2 and is passed to the monitoring module 5. The latter is designed to implement a monitoring strategy, in particular for cold or freezing starting of the fuel cell arrangement 2. For this purpose, the monitoring module 5 receives as input variables the voltage signal U and, optionally, the temperature signal T from the temperature sensor 5, which is used to determine whether cold or freezing starting is occurring. If so, or if cold or freezing starting is defined in some other way, then a low voltage value $U_{nom}$ is defined as the nominal value for the output voltage U, corresponding to an individual cell voltage in the fuel cells of between 0.2 and 0.45 V. A value $U_{nom}=150$ V is assumed for the rest of the explanation in this example.

The monitoring strategy implemented by the monitoring module 5 uses as a manipulated variable the power distribution of the output power from the fuel cell arrangement 2, via the distribution module 6. The distribution module 6 is therefore designed to distribute the output power from the fuel cell arrangement 2 between the primary load 9 and the secondary loads 10 (the peripheral components 11 and the switchable components 12). The power distribution can be implemented on the one hand as illustrated schematically in FIG. 1, with the power being assigned to the loads by the distribution module 6. In alternative embodiments, the individual loads are addressed selectively by a control signal from the control apparatus 4, and increase or decrease their power demand in accordance with the control command.

Figure 2:
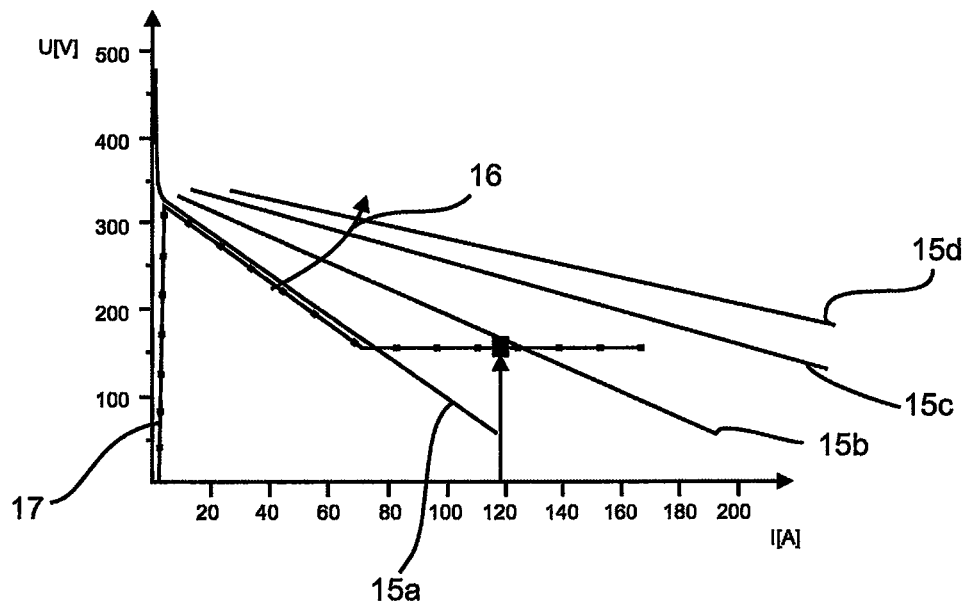
FIG. 2 is a graph (coordinate system representation) which illustrates the relationship between the output current and the output voltage of the fuel cell arrangement in FIG. 1 at different temperatures.

The fundamental concept of the monitoring strategy is illustrated in FIG. 2, which shows a plurality of output current-output voltage-characteristics 15a to 15d for different temperatures. (The arrow 16 points in the direction of rising temperatures.) One example of the monitoring strategy of the monitoring module 6 and of the control apparatus 4 is illustrated by the line profile 17. When the fuel cell arrangement 2 is switched on, loads (particularly peripheral components 11) are initially connected in a ramped form, with the output voltage U initially rising from 0 V to more than 300 V, and then falling to the low voltage value $U_{nom}$=150 V. Beyond this curve point, which is shown in the figure at about 70 Amperes, the distribution module 6 is controlled by the monitoring module 5 such that the power distribution and the process of switching loads on and off are set as a manipulated variable, in such a manner that the output voltage U from then on corresponds to the low voltage value $U_{nom}$. At a current level of about 120 Amperes, an enable signal is emitted, such that the vehicle can be driven in a reduced-power conservation or emergency mode.

Figure 3:
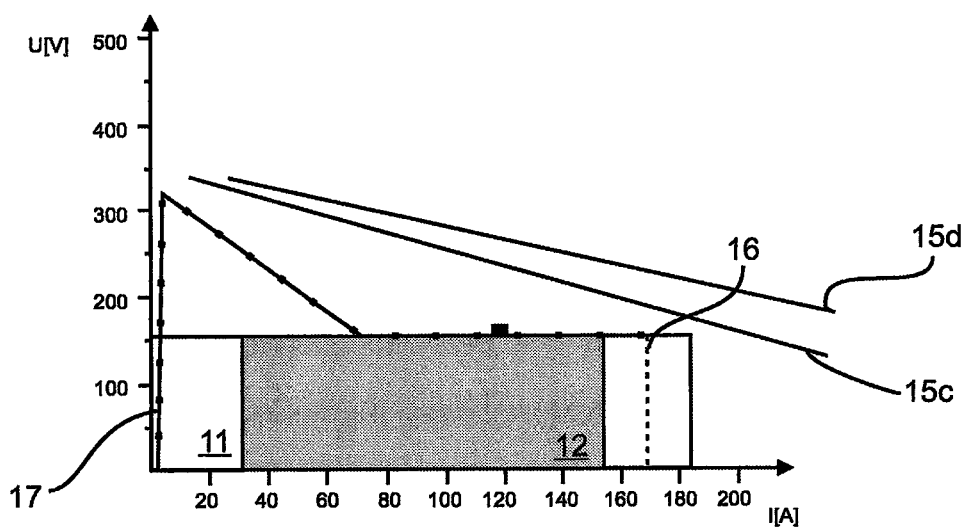
FIG. 3 is a graph which illustrates the method according to the invention, using the same coordinate system representation as that in FIG. 2.

FIG. 3 once again illustrates an exemplary embodiment of the method according to the invention, in which the peripheral components 11 are switched on successively in a first current range between 0 and 30 Amperes, in order to increase the current drawn, and therefore to reduce the output voltage U and, in the end, to reduce it to the low voltage value $U_{nom}$. Beyond an output current of about 30 Amperes, the peripheral components 11 are supplied completely, so that this current level or power level represents the required self-supply power for the fuel cell arrangement 2.

In a range between 30 Amperes and 150 Amperes, switchable components 12, such as DC/DC converters for low-voltage applications or for an energy storage apparatus (not illustrated) are switched on successively so that the increasing power output from the fuel cell arrangement 2 is compensated for by the loads that are switched on, and the output voltage U is maintained at the low voltage value $U_{nom}$.

Beyond a value of about 150 Amperes, further variable loads (for example, an electrical heater) must be switched on in order to limit the output voltage U to the low-voltage value $U_{nom}$. As an alternative, the primary load 9 can also be switched on, in order to tap off power.

In this range, it is impossible (or possible only with difficulty) to reduce the output voltage U exclusively by switching on secondary loads 10. In order to nevertheless ensure the low voltage value $U_{nom}$, the monitoring module 5 and the control apparatus 4 have the output interface 13, via which the air compressor 14 can be driven.

In this case, the drive for the air compressor 14 corresponds to a manipulated variable, to change the stoichiometry in the fuel cells 3. An air stoichiometry of 1.05 and 1.3 is normally chosen for normal operation at an output current of about 170 A. By reducing the air flow, the ratio between the fuel and oxidant is shifted in the direction of more fuel, which leads to a reduction in the maximum output current and the maximum output power, and therefore (taking into account the loads that are switched on) to a reduction in the output voltage in the direction of the low voltage value $U_{nom}$.

Since the use of the manipulated variable "stoichiometry" for control purposes is considerably more inert than the use of the manipulated variable "secondary loads switched on or off", the manipulated variable "stoichiometry" is used as a macromonitoring variable, and the manipulated variable "secondary loads switched on or off" is used as a micromonitoring variable in the monitoring circuit. This results in an operating point at about 170 Amperes, with one monitoring strategy being to perform macrocontrol of the power generation by controlling the air compressor 10, and to perform microcontrol of the power generation and distribution via the distribution module 6.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle fuel cell system comprising:
a fuel cell arrangement which has a plurality of fuel cells, and which emits an output voltage, current, and power during operation, with each fuel cell emitting a cell voltage during operation;
an output of said fuel cell arrangement that is coupleable to a vehicle drive as a primary load, and to a plurality of secondary loads; and
a control apparatus configured to control the primary load and the secondary loads; wherein,
the control apparatus has at least one of programming and circuitry to provide a monitoring circuit that is operable in a special operating mode of the fuel cell system;
said control apparatus is configured to switch said secondary loads on and off based on a temperature of the fuel cell arrangement and as a manipulated variable so as to keep the output voltage, as a reference variable, at a low voltage value which is formed when cell voltage of the individual fuel cells is less than 0.45 V on average, wherein the control apparatus is configured to keep the output voltage at a constant low voltage value.

2. The fuel cell system according to claim 1, wherein the special operating mode is one of cold starting and freezing starting.

3. The fuel cell system according to claim 1, wherein, in the special operating mode, the output power of the fuel cell arrangement is at least one of greater than a self-supply power of the secondary loads, and less than a maximum secondary load power.

4. The fuel cell system according to claim 3, wherein the control apparatus is configured to emit a driving enable signal as soon as the output power is greater than the self-supply power plus a variable power margin.

5. The fuel cell system according to claim 1, wherein the control apparatus is configured to control the output voltage to be greater than the low voltage value in a range of the output power between zero power and a self-supply power.

6. The fuel cell system according to claim 5, wherein the control apparatus is configured to control stoichiometry via the oxidant flow as a further manipulated variable in a power range that is greater than at least one of the maximum secondary load power and the self-supply power.

7. The fuel cell system according to claim 6, wherein the control apparatus is configured to monitor a manipulated variable "secondary loads switched on or off" and a manipulated variable "stoichiometry" by monitoring the output power of the fuel cell arrangement by the manipulated variable "stoichiometry" and by monitoring the output voltage by the manipulated variable "secondary loads switched on or off".

8. The fuel cell system according to claim 1, wherein the control apparatus is configured to treat power drawn by the driving operation as a disturbance variable in the monitoring circuit.

9. The fuel cell system according to claim 1, wherein the control circuit is configured so that the output voltage of the fuel cell arrangement is maintained at the low voltage value by successively switching the secondary loads on or off.

10. A method for monitoring a fuel cell system, the method comprising:
  controlling, by a control apparatus, a primary load and secondary loads, wherein the fuel cell system includes a fuel cell arrangement having a plurality of fuel cells, and an output of said fuel cell arrangement is coupleable to a vehicle drive as the primary load, and to the plurality of secondary loads;
  monitoring, by a monitoring circuit of the control apparatus, an output voltage of the fuel cell arrangement in a special operating mode; and
  maintaining, in the special operating mode, the output voltage of the fuel cell arrangement at a low voltage value by switching secondary loads on or off based on a temperature of the fuel cell arrangement, wherein said low voltage value is less than the output voltage value formed by operation of fuel cells in a fuel cell arrangement in the fuel cell system with a cell voltage of less than 0.45 V on average, wherein the control apparatus maintains the output voltage at a constant low voltage value.

11. The method according to claim 10, wherein the special operating mode is one of cold starting and freezing starting.

12. The method according to claim 10, wherein, in the special operating mode, the output power of the fuel cell arrangement is at least one of greater than a self-supply power of the secondary loads, and less than a maximum secondary load power.

13. The method according to claim 12, wherein the control apparatus emits a driving enable signal as soon as the output power is greater than the self-supply power plus a variable power margin.

14. The method according to claim 10, wherein the control apparatus controls the output voltage to be greater than the low voltage value in a range of the output power between zero power and a self-supply power.

15. The method according to claim 14, wherein the control apparatus controls stoichiometry via the oxidant flow as a further manipulated variable in a power range that is greater than at least one of the maximum secondary load power and the self-supply power.

16. The method according to claim 15, wherein a manipulated variable "secondary loads switched on or off" and a manipulated variable "stoichiometry" are monitored by monitoring the output power of the fuel cell arrangement by the manipulated variable "stoichiometry" and by monitoring the output voltage by the manipulated variable "secondary loads switched on or off".

17. The method according to claim 10, wherein the control apparatus treats power drawn by the driving operation as a disturbance variable in the monitoring circuit.

18. A method for monitoring a fuel cell system, the method comprising:
  controlling, by a control apparatus, a primary load and secondary loads, wherein the fuel cell system includes a fuel cell arrangement having a plurality of fuel cells, and an output of said fuel cell arrangement is coupleable to a vehicle drive as the primary load, and to the plurality of secondary loads;
  monitoring, by a monitoring circuit of the control apparatus, an output voltage of the fuel cell arrangement in a special operating mode; and
  maintaining, in the special operating mode, the output voltage of the fuel cell arrangement at a low voltage value by switching secondary loads on or off based on a temperature of the fuel cell arrangement, wherein said low voltage value is less than the output voltage value formed by operation of fuel cells in a fuel cell arrangement in the fuel cell system with a cell voltage of less than 0.45 V on average,
  wherein the output voltage of the fuel cell arrangement is maintained at the low voltage value by successively switching the secondary loads on or off.

* * * * *